United States Patent Office 2,795,594
Patented June 11, 1957

2,795,594

11-OXYGENATED-4,17(20)-PREGNADIEN-21-AL-20-OL-3-ONE AND ITS DERIVATIVES

Roger E. Beyler, Westfield, N. J., assignor to Merck & Co., Inc., Rahway, N. J., a corporation of New Jersey No Drawing. Continuation of application Serial No. 565,768, February 16, 1956. This application April 25, 1956, Serial No. 580,474

26 Claims. (Cl. 260—397.45)

This invention relates to the preparation of steroid aldehydes and particularly to processes for preparing 11-oxygenated-4,17(20)-pregnadien-21-al-20-ol-3-one and derivatives thereof and to new compounds thus produced.

This is a continuing application of copending application Serial No. 565,768, filed February 16, 1956, now abandoned.

In accordance with the invention 11-oxygenated-4-pregnen-21-al-3,20-dione or its hydrate (11-oxygenated-4-pregnene-21,21-diol-3,20-dione) is reacted with an enolizing agent to produce the corresponding 11-oxygenated-4,17(20)-pregnadien-21-al-20-ol-3-one which can be converted to the corresponding 20-ester by reacting with an acylating agent. The latter compounds can be produced directly by simultaneously enolizing and acylating the 11-oxygenated-4-pregnen-21-al-3,20-dione or its hydrate. These pregnadiene aldehydes can be modified in physical properties, such as solubility, by converting to aldehyde addition products such as acetals, acylates and the like. These pregnadiene aldehydes and their derivatives have cortisone-like activity and can be compounded and used in a manner similar to cortisone.

By the term 11-oxygenated, as used herein, is meant a compound wherein a keto group or a hydroxy group is attached to the 11-carbon atom.

The reactions of the invention can be chemically illustrated, as an example when using 11-oxygenated-4-pregnen-21-al-3,20-dione as the starting material, as follows:

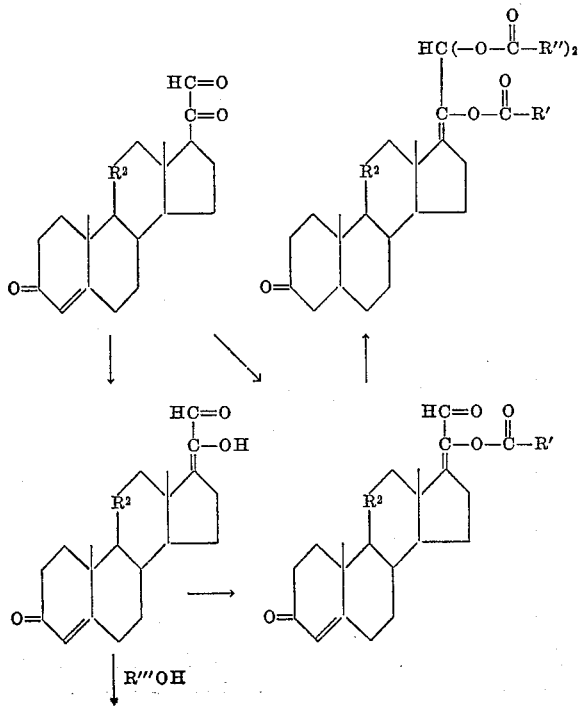

wherein $R^2$ is C=O, or $$C\begin{matrix}OH\\H\end{matrix}$$

R' and R" are hydrocarbon groups and can be the same or different groups, and R''' is an alkyl group.

The compounds prepared by these processes which are new compounds have the formula— wherein R is hydrogen or $$-\overset{O}{\underset{\|}{C}}-\text{hydrocarbon}$$

and aldehyde addition products thereof. These compounds similarly have cortisone-like activity. They have demonstrated liver glycogen deposition and inhibitory properties in the local granuloma tests and to have no systematic granuloma adrenal and thymus involution or sodium retention.

The 11-oxygenated-4-pregnen-21-al-3,20-dione or its hydrate is reacted with an enolizing agent to produce the corresponding 11-oxygenated-4,17(20)-pregnadien-21-al-20-ol-3-one. The enolizing agent is preferably a mixture of an organic carboxylic acid and a tertiary-amine. The carboxylic acid is most conveniently a mono-basic organic carboxylic acid containing from one to six carbon atoms. Typical examples of suitable carboxylic acids are acetic acid, propionic acid, butyric acid, valeric acid and caproic acid. The tertiary-amine is preferably a high boiling amine since it simplifies reaction conditions. Examples of suitable tertiary-amines are pyridine, quinoline, the collidines, diethylaniline and dimethylaniline. The tertiary-amine preferably containing from five to ten carbon atoms can serve as the reaction medium or the reaction can be carried out in other organic solvents such as ethers, aromatic hydrocarbons, chlorinated hydrocarbons and the like as for example dioxane, dimethoxyethane, benzene, toluene and chloroform. The aliphatic carboxylic acid is preferably present in about 20 to 80% by weight, and the tertiary-amine is present in about 20 to 80% by weight. The reaction is preferably carried out at about 20 to 100° C., although higher and lower temperatures can be used. Within this preferred temperature range, with the preferred reactants, the reaction usually requires from a few minutes to four hours for completion. The product can be recovered in any conventional manner, as for example by pouring into ice cold hydrochloric acid or aqueous sodium bicarbonate and extracting with an organic solvent such as dichloromethane, trichloromethane and ethylacetate and removing the solvent from the desired product such as by distillation.

The 11-oxygenated-4,17(20)-pregnadien-21-al-20-ol-3-one is reacted with an acylating agent to produce the corresponding 20-acylate. Suitable acylating agents are acid halides such as acid chlorides, acid anhydrides and others, with acid anhydrides being preferred. The acylating agents are preferably those containing from one to eleven carbon atoms inclusive. Typical examples of such acids are formic, acetic, propionic, butyric, valeric, hexanic, heptanic, octanic, carbocyclic acids such as, cyclopentanecarboxylic and cyclopentylpropionic, benzoic, toluic, oxalic and the like. The acids can also contain substituents such as halogen, alkyl, alkoxy and others which are non-reactive under the reaction conditions employed. It is usually preferred to use a large excess of acylating agent of at least two moles and to carry out the reaction in the presence of tertiary-amine such as pyridine, quinoline, the collidines, diethylaniline and dimethylaniline. The tertiary-amine can act as the reaction medium or the reaction can be carried out in a suitable solvent such as aromatic hydrocarbons, chlorinated hydrocarbons and the like. The reaction is preferably carried out at a temperature of 20 to 100° C., although higher and lower temperatures can be used. The reaction requires from a few minutes to twenty hours for completion when using the preferred reaction temperature and reactants. The product can be recovered in any conventional manner, as for example by extraction with an organic solvent, and then removing the solvent such as by evaporation. Suitable examples of the acylates which can be prepared in this manner are the acetate, chloracetate, propionate, butyrate, tertiary-butylacetate, trimethyl acetate, valerate, hexanate, heptanate, octanate, benzoate, p-methoxybenzoate, phenyl acetate, p-aminobenzoate, hydrocinnanate and hemisuccinimate.

The 11-oxygenated-4-pregnen-21-al-3,20-dione or its hydrate can be converted to the 20-acylate of 11-oxygenated-4,17(20)-pregnadien-21-al-20-ol-3-one by simultaneously enolizing and acylating. This is accomplished by combining the enolizing and acylating agents described above in a single reaction medium. As an example, using the preferred reaction, and aliphatic carboxylic acid containing from one to six carbon atoms, an organic acid anhydride and a tertiary-amine are combined and contacted with the 11-oxygenated-4-pregnen-21-al-3,20-dione or its hydrate. This reaction is preferably carried out at a temperature of about 20 to 100° C. At this temperature the reaction usually requires from a few minutes to five hours for completion. The product is recovered in any of the conventional manners such as by extraction with an organic solvent and removing the solvent from the desired product by distillation.

The 11-oxygenated-4,17(20)-pregnadien-21-al-20-ol-3-one and corresponding 20-acylates can be converted to 21-acetals by reaction the aldehyde with an alcohol such as one containing less than seven carbon atoms as for example methanol, propanol, butanol, hexanol and the like in the presence of an acid or a base. Suitable acids are mineral acids such as hydrochloric acid, hydrobromic acid and sulfuric acid. Suitable bases are alkali metal and alkaline earth metal hydroxides, carbonates and lower alkoxides such as sodium hydroxide, potassium hydroxide, barium hydroxide, sodium bicarbonate, potassium bicarbonate, sodium ethoxide, potassium methoxide and sodium proponoxide. Typical of such products are 21,21-dimethoxy-4-pregnene-11β-ol-3,20-dione; 21,21-diethoxy-4-pregnene-11β-ol-3,20-dione and 21,21-dipropionoxy-4-pregnene-11β-ol-3,20-dione.

The 20-acylates of 11-oxygenated-4,17(20)-pregnadien-21-al-20-ol-3-one can be further acylated to form the corresponding 21,21-diacylate. Suitable acylating agents are organic acids. The acylating agent preferably contains from one to eleven carbon atoms inclusive. Typical examples of such acids are formic, acetic, propionic, butyric, valeric, hexanic, heptanic, octanic, carbocyclic acids such as cyclopentanecarboxylic and cyclopentylpropionic, benzoic, toluic, oxalic and the like. The acids can also contain substituents such as halogen, alkyl, alkoxy and others which are non-reactive under the reaction conditions employed. It is usually preferred to use a large excess of acylating agent and to carry out the reaction in the presence of a strong acid such as sulfuric acid. The organic acid can act as the reaction medium or the reaction can be carried out in a suitable solvent such as aromatic hydrocarbons, chlorinated hydrocarbons and the like. The reaction is preferably carried out at a temperature of about 0° C. The reaction requires a few minutes for completion when using the preferred reaction temperature and reactants. The product can be recovered in any conventional manner, as for example by extraction with an organic solvent, and then removing the solvent such as by evaporation. Suitable examples of the acylates which can be prepared in this manner are the acetate, chloracetate, propionate, butyrate, tertiary-butylacetate, trimethyl acetate, valerate, hexanate, heptanate, octanate, benzoate, p-methoxybenzoate, phenyl acetate, p-aminobenzoate, hydrocinnanate and hemisuccinimate. Typical examples of the compounds which can be prepared are 20,21,21-triacetylate of 4,17(20)-pregnadien-11β,20,21,21-tetrol-3-one; 4,17(20)-pregnadien-11β,20,21,21-tetrol-3-one-20-acetate-20,21,21-dipropionate; 4,17(20)-pregnadien-11β,20,21,21-tetrol-3-one-20-acetate-21,21-dibenzoate and 4,17(20)-pregnadien-11β,20,21,21-tetrol-3-one-20,21,21-tribenzoate.

The following examples are given for the purposes of illustration:

EXAMPLE 1

*4,17(20)-pregnadien-21-al-20-ol-3,11-dione*

Three hundred milligrams of 4-pregnen-21-al-3-11,20-trione were dissolved in 1 ml. of pyridine and 1 ml. of acetic acid and heated at 60° C. for two hours. The mixture was poured into ice-2.5 N hydrochloric acid and extracted with methylene chloride several times. The combined extract was washed with dilute hydrochloric acid, aqueous sodium bicarbonate and water. After drying with magnesium sulfate the methylene chloride was distilled off. The residual oil contained about 30% of 4,17(20)-pregnadien-21-al-20-ol-3,11-dione as indicated by the absorption at about 280 m$\mu$.

EXAMPLE 2

*4,17-pregnadien-21-al-20-ol-3,11-dione-20-acetate*

The product prepared in Example 1 was dissolved in 1 ml. of pyridine and 1 ml. of acetic anhydride and kept at room temperature for 15 hours. It was poured into water-methylene chloride, separated, and the methylene chloride layer washed with dilute hydrochloric acid and aqueous sodium bicarbonate, dried and concentrated. The entire residue was chromatographed on silica gel to give the 4,17-pregnadien-21-al-20-ol-3,11-dione-20-acetate. Melting point 226–232° C. Its infrared spectrum contained bands at 5.69, 5.85, 5.98, 6.18$\mu$.

EXAMPLE 3

*4,17-pregnadien-21-al-20-ol-3,11-dione-20-acetate*

Fifty-four milligrams of the hydrate of 4-pregnen-21-al-3,11,20-trione was dissolved in 0.5 cc. pyridine, 0.5 cc. acetic acid and 0.5 cc. acetic anhydride. The mixture was heated at 60° C. for 2.5 hours. It was poured into ice water and extracted with methylene chloride. The methylene chloride was washed with water, dilute hydrochloric acid, aqueous sodium bicarbonate, dried with magnesium sulfate and concentrated. The residue was crystallized with acetone-ether to give 4,17-pregnadien-21-al-20-ol-3,11-dione-20-acetate.

EXAMPLE 4

*4,17-pregnadiene-11β,20-diol-21-al-3-one acetate*

To 100 mg. of 4-pregnene-3,20-dione-11,21-diol in 5 ml. of methanol was added 5 ml. of 80% methanol containing 150 mg. of copper acetate and one drop of acetic acid. The mixture was heated for five minutes on the steam bath and decanted from copper oxide. The solution was concentrated in vacuo, water and ether added, and the ether extract washed once more with water. Evaporation of the ether gave 102 mg. of residue. Acetone-ether trituration gave crystalline 4-pregnen-21-al-3,20-dione-11,21-diol hydrate, melting point 132–138° C.

A total of 33 mg. of crude 4-pregnen-21-al-3,20-dione-11,21-diol similarly prepared was added to 2 ml. each of pyridine, acetic acid and acetic anhydride. After heating for three hours at 60° C. the mixture was poured into ice-dilute hydrochloric acid and extracted immediately with methylene chloride. The extract was washed with acetic acid, sodium bicarbonate and water, dried and evaporated. The residual oil was chromatographed on ten grams of silica gel. From the ether-chloroform effluent (9:1) the 20-acetate of 4,17(20)-pregnadien-21-al-11β,20-diol-3-one was obtained, melting point 213–217° C.

EXAMPLE 5

Five hundred mg. of 20-acetate of 4,17(20)-pregnadien-21-al-20-ol-3,11-dione was dissolved in 35 ml. of methanol, 1.25 ml. of concentrated hydrochloric acid added and the mixture allowed to stand overnight at room temperature. Addition of water gave crystals, melting point 153–157° C. Recrystallization from methylene chloride-ether gave pure 21,21-dimethoxy-4-pregnen-3,11,20-trione.

EXAMPLE 6

One hundred mg. of 20-acetate of 4,17(20)-pregnadien-21-al-20-ol-3,11-dione in 5 ml. of methanol was added to 100 mg. of sodium bicarbonate dissolved in 0.1 ml. of water. The mixture was allowed to stand for 48 hours at room temperature. Removal of part of the methanol in vacuo and addition of water yielded 21,21-dimethoxy-4-pregnene-3,11,20-trione, melting point 156–158° C. Recrystallization gave a sample identical with that above, melting point 160–162° C.

EXAMPLE 7

One hundred mg. of 20-acetate of 4,17(20)-pregnadien-21-al-3,11,20-trione in 5 ml. of methanol was added to 0.54 ml. 1.3 N sodium hydroxide. The mixture was allowed to stand for 17 minutes at 0° C. Removal of part of the methanol in vacuo and addition of water yielded ca. 40% of 21,21-dimethoxy-4,17(20)-pregnadiene-3,11,20-trione, melting point 150–152° C.

EXAMPLE 8

A 0.25% topical ointment of 4,17-pregnadiene-11β,20-diol-21-al-3-one-20-acetate was prepared as follows:

| | Gm. |
|---|---|
| 4,17-pregnadiene-11β,20-diol-21-al-3-one-20-acetate | 0.0025 |
| Zinc stearate | 0.0855 |
| Propylene glycol | 0.3070 |
| Carbowax 1500 | 0.3800 |
| Carbowax 4000 | 0.0450 |
| Distilled water | 0.0450 |

Melt the carbowaxes and with stirring add the propylene glycol, zinc stearate, the steroid and water. Pass the resulting ointment through a roller mill using cold rollers until the ointment is smooth. The resulting ointment is especially suited for dermatologic use.

An 0.5% ointment is prepared by increasing the amount of steroid and proportionately decreasing the amount of zinc stearate in the ointment. Other suitable ointments may be prepared by substituting one of the active steroids described in the preceding examples.

Any departure from the above description which conforms to the present invention is intended to be included within the scope of the claims.

What is claimed is:

1. A process which comprises reacting 11-oxygenated-4-pregnen-21-al-3,20-dione with an enolizing agent comprising an organic carboxylic acid containing less than seven carbon atoms and a tertiary-amine to produce 11-oxygenated-4,17(20)-pregnadien-21-al-20-ol-3-one.

2. The process of claim 1 wherein the enolizing agent is a mixture of acetic acid and pyridine.

3. The process of claim 2 wherein the reaction is carried out at a temperature of about 20 to 100° C.

4. A process which comprises reacting 11-oxygenated-4,17(20)-pregnadien-21-al-20-ol-3-one with an acylating agent wherein the acyl residue of the agent is derived from a carboxylic acid containing less than twelve carbon atoms to produce the corresponding 20-acylated derivative of 11-oxygenated-4,17(20)-pregnadien-21-al-20-ol-3-one.

5. The process of claim 4 wherein the acylating agent is an organic acid anhydride.

6. The process of claim 4 wherein the acylating agent is acetic acid anhydride.

7. The process of claim 6 wherein the reaction is carried out in the presence of a tertiary-amine.

8. The process of claim 6 wherein the reaction is carried out at a temperature of about 20 to 80° C.

9. The process of claim 7 wherein the tertiary-amine is pyridine.

10. A process which comprises reacting 11-oxygenated-4-pregnen-21-al-3,20-dione with an enolizing agent comprising an organic carboxylic acid containing less than seven carbon atoms and a tertiary amine, and an acylating agent wherein the acyl residue of the agent is derived from a carboxylic acid containing less than twelve carbon atoms to produce the corresponding 20-acylate of 11-oxygenated-4,17(20)-pregnadien-21-al-20-al-3-one.

11. The process of claim 10 wherein the acylating agent is an organic acid anhydride.

12. The process of claim 11 wherein the enolizing agent is a mixture of acetic acid and pyridine and the acylating agent is acetic anhydride.

13. The process of claim 12, wherein the reaction is carried out at a temperature of about 20 to 100° C.

14. A process which comprises reacting 4-pregnen-21-al-11-ol-3,20-dione with an enolizing agent comprising an organic carboxylic acid containing less than seven carbon atoms and a tertiary amine to produce 4,17(20)-pregnadien-21-al-11,20-diol-3-one.

15. The process of claim 14 wherein the enolizing agent is a mixture of acetic acid and pyridine.

16. A process which comprises reacting 4,17(20)-pregnadien-21-al-11,20-diol-3-one with an acylating agent wherein the acyl residue of the agent is derived from a carboxylic acid containing less than twelve carbon atoms to produce the corresponding 20-acylated derivative.

17. The process of claim 16 wherein the acylating agent is acetic acid anhydride.

18. A process which comprises reacting 4-pregnen-11-ol-21-al-3,20-dione with an enolizing agent comprising an organic carboxylic acid containing less than seven carbon atoms and a tertiary amine, and an acylating agent wherein the acyl residue of the agent is derived from a carboxylic acid containing less than twelve carbon atoms to produce the corresponding 20-acylate of 4,17(20)-pregnadien-21-al-11,20-diol-3-one.

19. The process of claim 18 wherein the enolizing agent is a mixture of acetic acid and pyridine and the acylating agent is acetic anhydride.

20. Compounds selected from the group consisting of compounds having the formula—

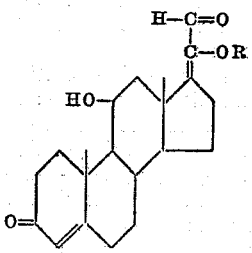

wherein R is selected from the group consisting of hydrogen and

wherein R' is a hydrocarbon group containing less than twelve carbon atoms; and 21,21-diacylates thereof wherein the acyl group has the formula

wherein R" is a hydrocarbon group containing less than twelve carbon atoms.

21. 4,17(20)-pregnadien-21-al-11,20-diol-3-one.
22. A compound having the formula—

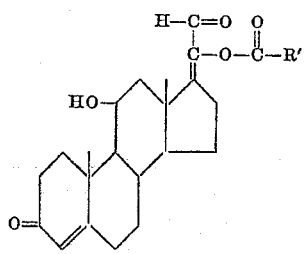

wherein R' is a hydrocarbon group containing less than twelve carbon atoms.

23. The 20-acetate of 4,17(20)-pregnadien-21-al-11,20-diol-3-one.

24. A compound having the formula—

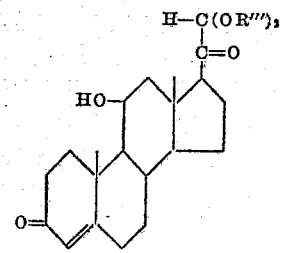

wherein R''' is a hydrocarbon group containing less than seven carbon atoms.

25. 21,21-dimethoxy-4-pregnene-11β-ol-3,20-dione.

26. A therapeutic composition adapted for topical application to areas to reduce or eliminate inflammatory or irritated conditions which comprises a dermatologic vehicle intermittently admixed with compounds selected from the group consisting of compounds having the formula—

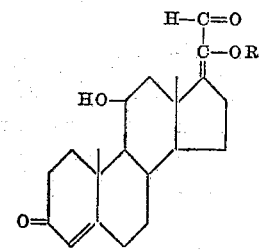

wherein R is selected from the group consisting of hydrogen and

wherein R' is a hydrocarbon group containing less than twelve carbon atoms; and 21,21-diacylates thereof wherein the acyl group has the formula

wherein R" is a hydrocarbon group containing less than twelve carbon atoms.

References Cited in the file of this patent
UNITED STATES PATENTS

| | | |
|---|---|---|
| 2,563,247 | Kendall | Aug. 7, 1951 |
| 2,577,018 | Kendall | Dec. 4, 1951 |
| 2,683,153 | Kendall | July 6, 1954 |
| 2,684,376 | Oliveto | July 20, 1954 |
| 2,708,202 | Pfister | May 10, 1955 |
| 2,732,384 | Beall | June 24, 1956 |